US006529521B1

(12) United States Patent
MacArthur (10) Patent No.: US 6,529,521 B1
(45) Date of Patent: Mar. 4, 2003

(54) DATA STORAGE SYSTEM

(75) Inventor: Stephen D. MacArthur, NorthBorough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/472,583

(22) Filed: Dec. 27, 1999

(51) Int. Cl.[7] .................................................. H04J 3/17
(52) U.S. Cl. ...................................................... 370/463
(58) Field of Search ................................. 370/463, 389, 370/473–477, 412, 911, 235, 445, 335, 360, 419, 229; 709/249, 233–237, 200, 234, 213; 713/310, 413

(56) References Cited

U.S. PATENT DOCUMENTS

| | | | |
|---|---|---|---|
| 5,206,939 A | | 4/1993 | Yanai et al. ................. 395/400 |
| 5,305,321 A | * | 4/1994 | Crayford ..................... 370/389 |
| 5,404,544 A | * | 4/1995 | Crayford ..................... 713/310 |
| 6,094,439 A | * | 7/2000 | Krishna et al. ............. 370/445 |
| 6,167,029 A | * | 12/2000 | Ramakrishnan ............. 370/235 |
| 6,260,073 B1 | * | 7/2001 | Walker et al. ............... 370/412 |

OTHER PUBLICATIONS

Co–Pending patent application Ser. No. 09/224,194 filed Dec. 30, 1998, Entitled "Data Storage System".

* cited by examiner

Primary Examiner—Kwang Bin Yao
Assistant Examiner—Prenell Jones
(74) Attorney, Agent, or Firm—Daly, Crowley & Mofford, LLP (57) ABSTRACT

A controller for providing buffering between a data source/destination and a network. The network is coupled to the controller through an Ethernet bus. The controller includes an Ethernet MAC Core coupled to the Ethernet bus. A buffer is disposed between the MAC Core and the data source/destination for storing data/control frames. Each frame has an Ethernet data portion and an Ethernet MAC Core control signal portion to reduce central processing unit overhead in processing transmission and reception of Ethernet frame data. A control section enables the frames to pass between the source/destination and the network through the MAC Core under control of the buffer stored Core control signals portion of the frame.

8 Claims, 13 Drawing Sheets

DATA STORAGE SYSTEM

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large mainframe computer systems require large capacity data storage systems. These large host computer systems generally include data processors which perform many operations on data introduced to the computer system through peripherals including the data storage system. The results of these operations are output to peripherals, including the storage system.

One type of data storage system is a magnetic disk storage system. Here a bank of disk drives and the host frame computer system are coupled together through a system interface. The system interface includes "front end" directors coupled to the host computer and "back end" disk directors coupled to the bank of disk drives. The system interface operates the directors in such a way that they are transparent to the computer. That is, data is stored in, and retrieved from, the bank of disk drives in such a way that the mainframe computer system merely thinks it is operating with one mainframe memory. One such system is described in U.S. Pat. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the system interface may also include, in addition to the front end and back end directors, addressable cache memories. The cache memory is a semiconductor memory and is provided to rapidly store data from the host computer system before storage in the disk drives, and, on the other hand, store data from the disk drives prior to being sent to the host computer. The cache memory being a semiconductor memory, as distinguished from a magnetic memory as in the case of the disk drives, is much faster than the disk drives in reading and writing data.

The front-end directors, back end directors and cache memory are interconnected through a backplane printed circuit board. More particularly, disk directors are mounted on disk director printed circuit boards. The front-end directors are mounted on front-end printed circuit boards. And, cache memories are mounted on cache memory printed circuit boards. The back end director, front-end director and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the front-end directors is connected to one bus and another set of the front-end directors is connected to the other bus. The cache memories are connected to both buses. Each one of the buses provides data, address and control information.

Thus, the use of two, or more, buses provides a degree of redundancy to protect against a total system failure in the event that the directors, or disk drives connected to one bus fail. Further, the use of two, or more, buses increases the data transfer bandwidth of the system compared to a system having a single bus.

As is also known in the art, in one type of data storage system the system interface is coupled to a personal computer (PC). The PC is used for such things as testing the system and updating programs stored in the directors. The communications between the PC and the system interface uses microprocessors (i.e., central processing units (CPUs) in the directors. In order for the CPUs to perform their primary function, which is moving data between the host computer and the disk drives with maximum speed, it is desirable to reduce the time the required for the CPU to communicate with the PC.

SUMMARY OF THE INVENTION

In accordance with the present invention, a controller is provided for providing buffering between a data source/destination and a network. The network is coupled to the controller through an Ethernet bus. The controller includes an Ethernet MAC Core coupled to the Ethernet bus. A buffer is disposed between the MAC Core and the data source/destination for storing data/control frames. Each frame has an Ethernet packet data portion and an Ethernet MAC Core control signal portion. A control section enables the frames to pass between the source/destination and the network through the MAC Core under control of the buffer stored Core control signals portion of the packets independently of the operation of the central processing unit.

In accordance with one embodiment of the invention, a storage system is provided wherein a host computer is coupled to a bank of disk drives through a system interface. The system interface includes a memory. A plurality of directors controls data transfer between the host computer and the bank of disk drives as such data passes through the memory. Each one of the directors is in communication with the busses. Each one of the directors includes a controller is provided for providing buffering between a data source/destination and a network. The network is coupled to the controller through an Ethernet bus. The controller includes an Ethernet MAC Core coupled to the Ethernet bus. A buffer is disposed between the MAC Core and the data source/destination for storing data/control frames. Each frame has an Ethernet packet data portion and an Ethernet MAC Core control signal portion. A control section enables the packets to pass between the source/destination and the network through the MAC Core under control of the buffer stored Core control signals portion of the frames independently of the operation of the central processing unit.

With such an arrangement, the directors are able to perform their main task of controlling data flow between the host computer and the bank of disk drives while communication of such directors.

BRIEF DESCRIPTION OF THE DRAWINGS

These and other features of the invention will become more readily apparent from the following detailed description when read together with the accompanying drawings, in which.

DESCRIPTION OF THE PREFERRED EMBODIMENTS

System Architecture

Figure 1:
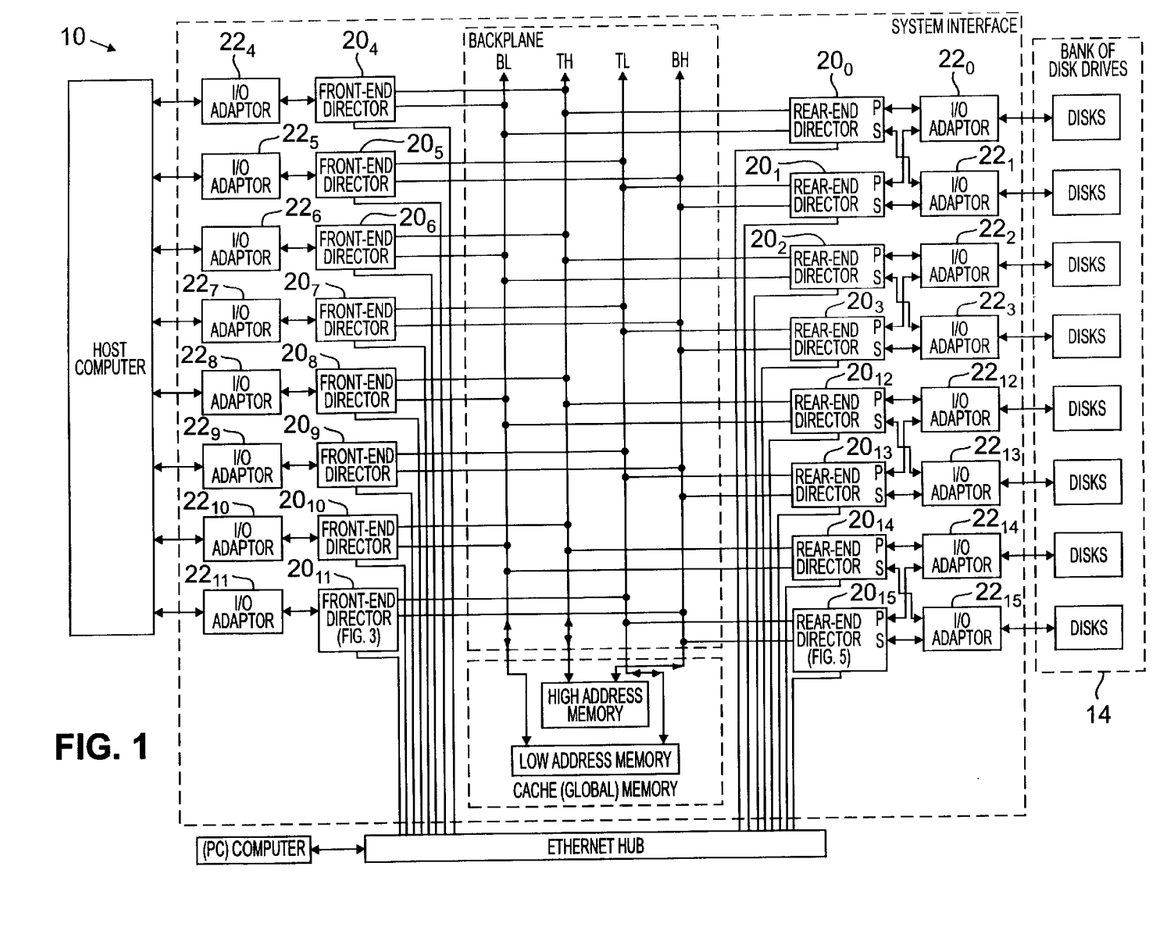
FIG. 1 is a block diagram of a data storage system according to the invention.

Referring now to FIG. 1, a data storage system 10 is shown wherein a host computer 12 is coupled to a bank 14 of disk drives through a system interface 16. The system interface 16 includes a cache, or "Global" memory 18, having high memory address sections 18H and low address memory sections 18L. A plurality of directors $20_0$–$20_{15}$ is provided for controlling data transfer between the host computer 12 and the bank 14 of disk drives as such data passes through the cache memory 18. A pair of high address busses TH, BH is electrically connected to the high address memory sections 18H. A pair of low address busses TL, BL electrically connected to the low address memory sections 18L. The cache memory 18 has a plurality of storage location addresses. Here, the storage locations having the higher addresses are in the high address memory sections 18H and the storage locations having the lower addresses are in the low address memory sections 18L. It should be noted that each one of the directors $20_0$–$20_{15}$ is electrically connected to one of the pair of high address busses TH, BH and one of the pair of low address busses TL, BL. Thus, each one of the directors $20_0$–$20_{15}$ is able to address all locations in the entire cache memory 18 (i.e., to both the high address memory sections 18H and the low address memory sections 18L) and is therefore able to store data in and retrieve data from any storage location in the entire cache memory 18.

More particularly, a rear-end portion of the directors, here directors $20_0$–$20_3$ and $20_{12}$–$20_{15}$, is electrically connected to the bank 14 of disk drives through I/O adapter cards $22_0$–$22_3$ and $22_{12}$–$22_{15}$ and a front-end portion of the directors, here directors $20_4$–$20_{11}$, is electrically connected to the host computer 12 through I/O adapter cards $22_4$–$22_{11}$. It should also be noted that each end of the busses TH, TL, BH, BL terminates in a pair of master and slave arbiters bus arbiters, not shown, such as those described in co-pending patent application Ser. No. 09/224,194 assigned to the same assignee as the present invention the entire subject matter thereof being incorporated herein by reference.

In operation, when the host computer 12 wishes to store data, the host computer 12 issues a write request to one of the front-end directors $20_4$–$20_{11}$, to perform a write command. One of the front-end directors $20_4$–$20_{11}$, replies to the request and asks the host computer 12 for the data. After the request has passed to the requesting one of the front-end directors $20_4$–$20_{11}$, the director determines the size of the data and reserves space in the cache memory 18 to store the request. The front-end director then produces control signals on either a high address memory bus (TH or BH) or a low memory address bus (TL, BL) connected to such front-end director depending on the location in the cache memory 18 allocated to store the data and enable the transfer to the cache memory 18. The host computer 12 then transfers the data to the front-end director. The front-end director then advises the host computer 12 that the transfer is complete. The front-end director looks up in a Table, not shown, stored in the cache memory 18 to determine which one of the rear-end directors $20_0$–$20_3$ and $20_{12}$–$20_{15}$ is to handle this request. The Table maps the host computer 12 address into an address in the bank 14 of disk drives. The front-end director then puts a notification in a "mail box" (not shown and stored in the cache memory 18) for the rear-end director which is to handle the request, the amount of the data and the disk address for the data. Other rear-end directors poll the cache memory 18 when they are idle to check their "mail boxes". If the polled "mail box" indicates a transfer is to be made, the rear-end director processes the request, addresses the disk drive in the bank, reads the data from the cache memory and writes it into the addresses of a disk drive in the bank 14. When data is to be read from the disk drive to the host computer 12 the system operates in a reciprocal manner.

Figure 2:
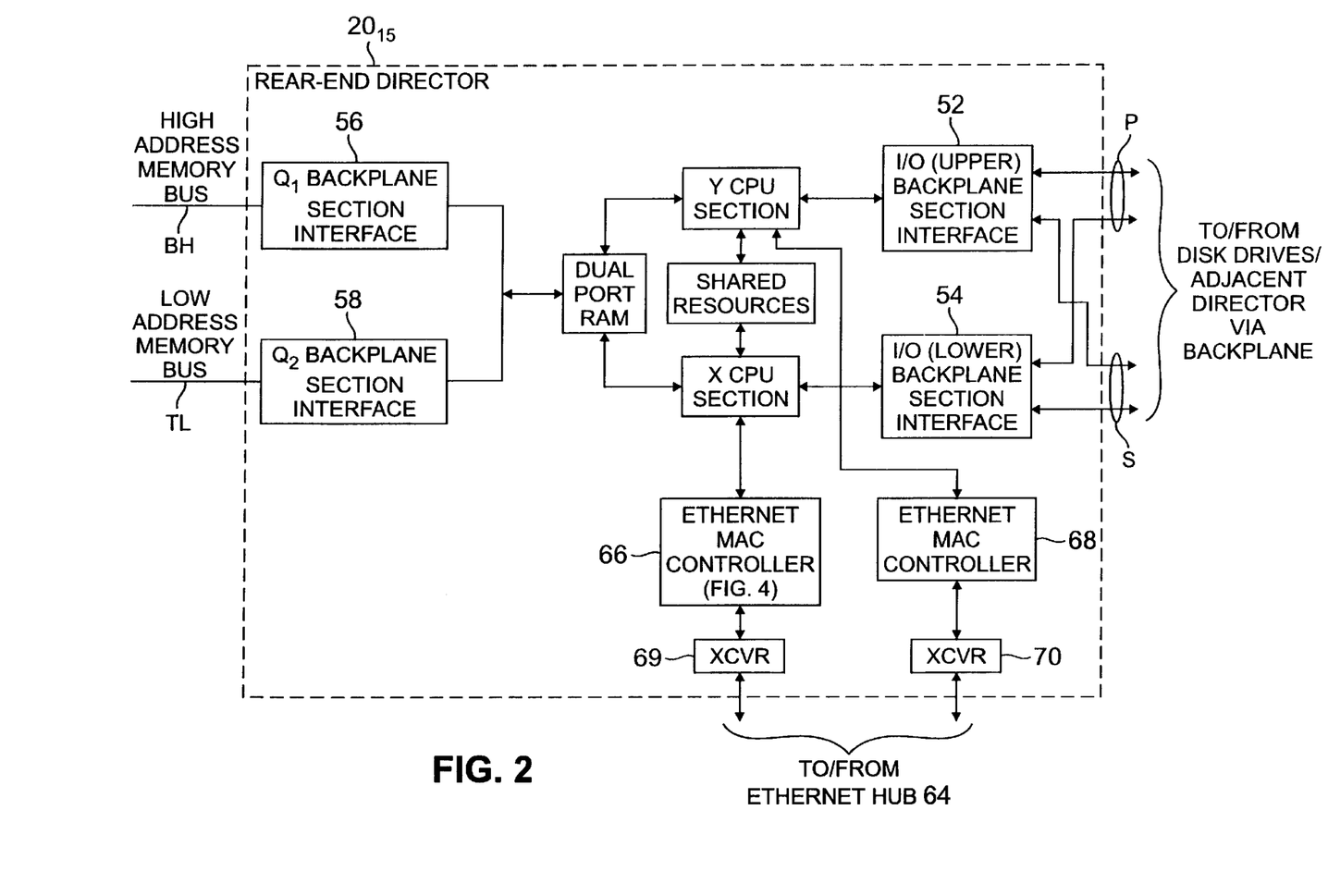
FIG. 2 is a schematic diagram of an exemplary one of a plurality of rear-end directors used in the system of FIG. 1.

Each one of the rear-end portion of the directors $20_0$–$20_3$, $20_{12}$–$20_{15}$ is identical in construction, an exemplary one thereof, here rear-end director $20_{15}$ being shown in FIG. 2 to include a pair of central processing sections, CPU X and CPU Y, a dual port random access memory (RAM), and shared resources (Flash memories, etc,) arranged as shown, coupled to the bank 14 of disk drives (FIG. 1) through I/O adapter card $22_{15}$ (FIG. 1) and I/O lower backplane section interfaces 52, 54 as indicated and to a high memory address bus, here BH, and low memory address bus, here TL, via a $Q_1$ and $Q_2$ backplane interface sections 56, 58 respectively. It should be noted that the director $20_{15}$ has a primary output port, P, and a secondary output port, S. As described in detail in the above-referenced co-pending patent application, the primary port P is connected to both I/O backplane interface 52 and I/O backplane interface 54. Likewise, the secondary port S is connected to both I/O backplane interface 52 and I/O backplane interface 54.

Each one of the front-end portion of the directors $20_4$–$20_{11}$ is identical in construction. An exemplary one thereof, here director $20_{11}$ is shown in detail in FIG. 3 to include a pair of central processing sections, CPU X and CPU Y, a dual port random access memory (RAM), and shared resources (Flash memories, etc.) arranged as shown, coupled to the host computer (through an adapter, not shown), as indicated and to a high memory address bus, here BH, and low memory address bus, here TL, via a $Q_1$ and $Q_2$ backplane interface sections 56, 58, respectively. It is noted that here the interfaces 52, 54 are connected to the host computer as described above in connection with FIG. 1.

In addition to controlling the flow of data between the host computer 12 (FIG. 1) and the bank of disk drives 14, i.e., the main function of the directors, the CPUs in the directors $20_0$–$20_{15}$ communicate with each other and with a personal computer 60 through an Ethernet network 62 via an Ethernet hub 64. The PC 60 is used for diagnostics and to upgrade microcodes stored in the Flash memories, etc. in the directors $20_0$–$20_{15}$.

Figure 3:
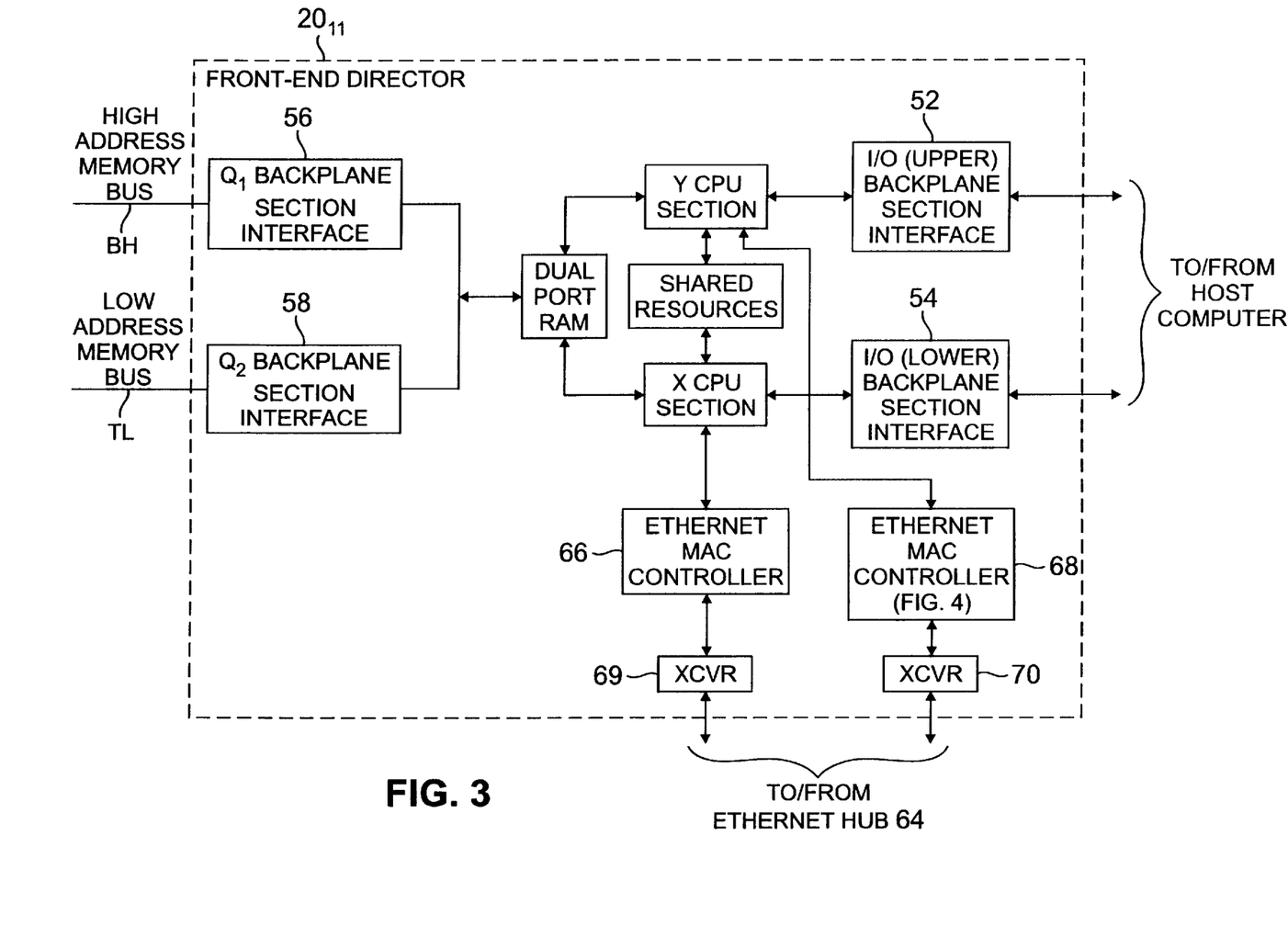
FIG. 3 is a schematic diagram of an exemplary one of a plurality of front-end directors used in the system of FIG. 1.

More particularly, referring to FIGS. 2 and 3, here each one of the directors $20_1$–$20_{15}$ includes a pair of Ethernet MAC controllers 66, 68 coupled to a corresponding one of the X and Y CPUs, respectively, as indicated. The Ethernet MAC controllers are identical in construction, an exemplary one thereof, here controller 66 being shown in detail in FIG. 4. The MAC controller 66 will be described in detail in connection with FIG. 4. Suffice it to say here, however, that the Ethernet controllers 66, 68 provide for buffering between a data source/destination, here the CPU in the director coupled thereto, and the other directors and the PC 60 (FIG. 1) through the Ethernet network 62 and hub 64. More particularly, the controllers 66, 68 are connected to the Ethernet hub 64 via Ethernet transceivers 69, 70, here medium independent interfaces (MII).

Figure 4:
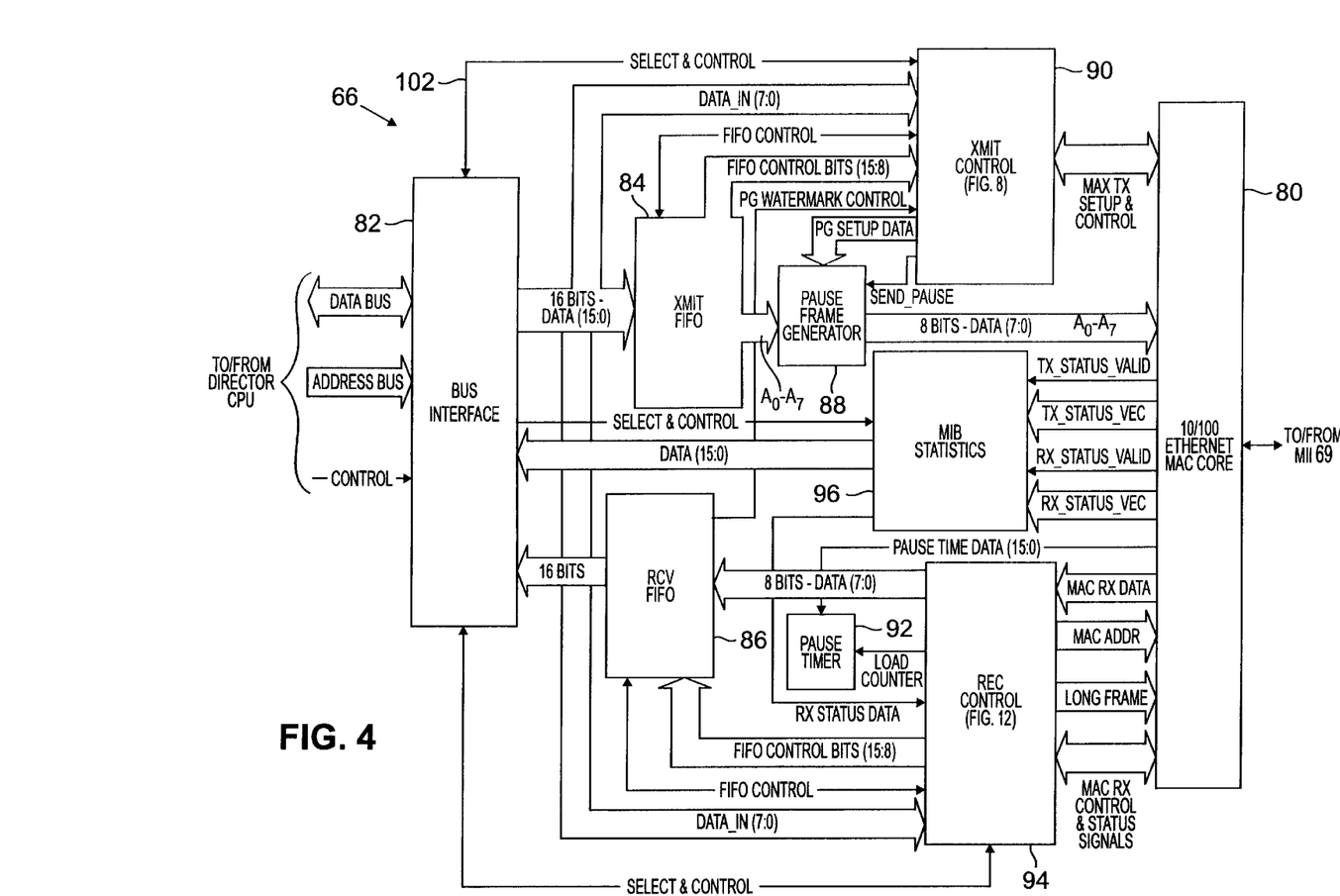
FIG. 4 is a block diagram of an exemplary Ethernet controller used in the directors of the system of FIG. 1.
Figures 5, 6:
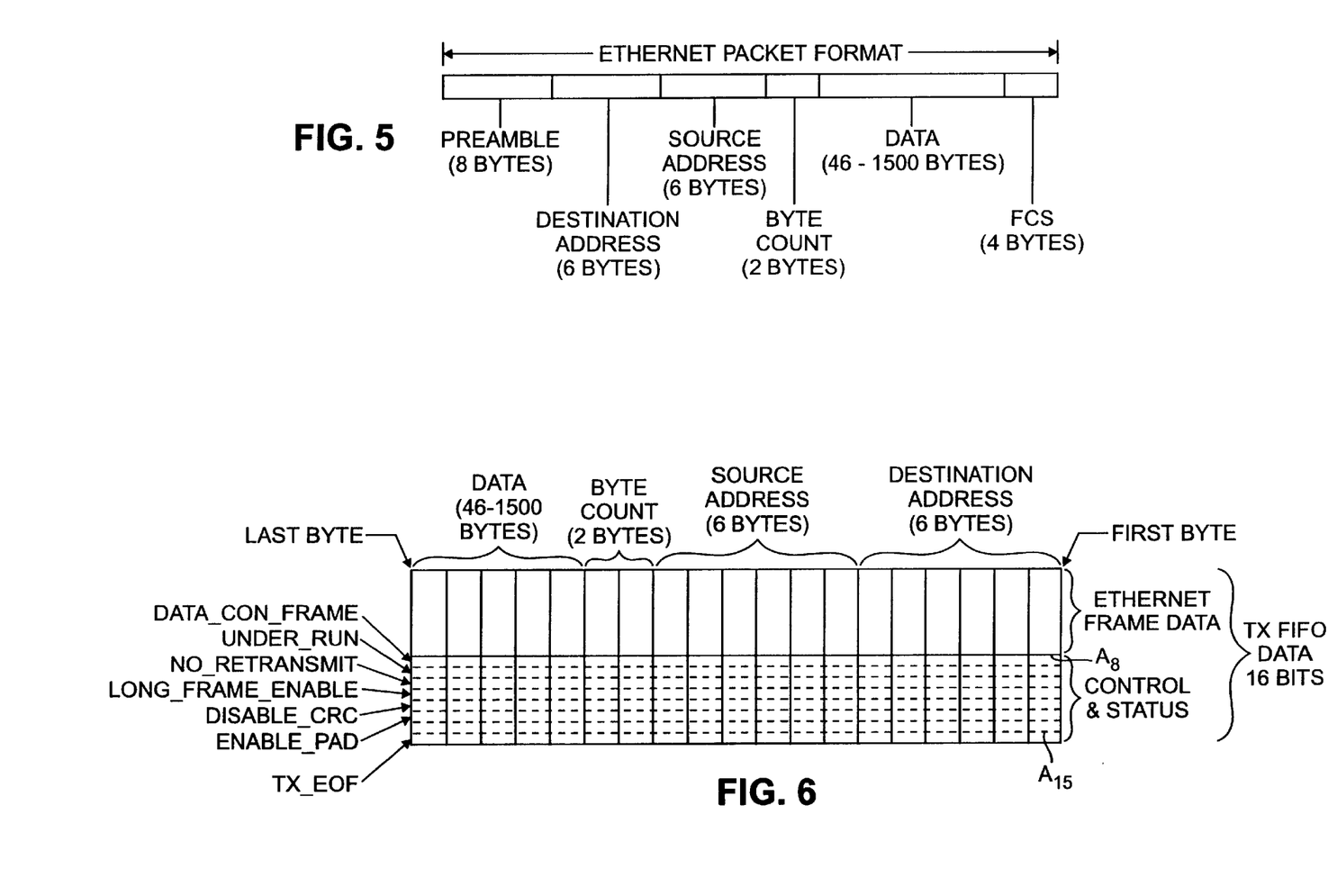
FIG. 5 is a diagram showing an Ethernet packet format according to the PRIOR ART.
FIG. 6 is a frame provided by the director of FIG. 2 to the Ethernet controller of FIG. 4 according to the invention.

Referring briefly to FIG. 5, a typical Ethernet Packet Format is shown. This is the format of a packet of data passing through the Ethernet network 62 (FIG. 1). The packet includes: a Preamble portion, or field, here 8 bytes; a Destination field, here 6 bytes; a Source Address, here 6 bytes; a Byte Count field, here 2 bytes; a data field, here from 46 to 1500 bytes; and, a Frame Check Sequence (FCS) field, here 4 bytes. Here, rather than have the CPU of the directors control the processing of data between the CPU and the other directors and/or the PC, the process control is performed by the Ethernet controller 66 (FIG. 4) thus enabling the CPUs to perform their main function, i.e., the control of data between the host computer 12 (FIG. 1) and the bank of disk drives 14.

Thus, referring now to FIG. 4, the MAC controller 66 includes an Ethernet MAC Core 80 coupled to the MII Interface (i.e., Ethernet transceiver 69 (FIG. 2), a bus interface 82 coupled to the CPU of a director, here director $20_{15}$, a buffer section, here having a transmit FIFO 84, and a receiver FIFO 86, a pause frame generator 88, a transmit control section 90, a pause timer 92, a receive control section 94, and a Management interface block (MIB) 96, all arranged as indicated.

Considering first the transmission of data from the CPU to the network and PC via the MII and Ethernet bus, it is noted that the transmit FIFO 84 is disposed between the MAC Core 89 and the director CPU for storing data/control packets provided by the director CPU. The CPU transmitted frame is shown in FIG. 6. Thus, each byte of the CPU transmitted packet is sixteen bits and includes an Ethernet frame data portion, here the lower bits A0–A7, and an Ethernet MAC Core control signal portion (i.e., "control and status", here the upper bits A15. Each transmitted frame thus includes, in the Ethernet frame data portion (i.e., bits A0–A7) the Destination address, here 6 bytes; the Source Address, here 6 bytes; the byte count, here 2 bytes; and Data here 46 to 1500 bytes. The frame concludes with a "last byte".

The control and status portion (i.e., bits A8–A15) includes:
Data/Control Frame=Control bit indicating Ethernet Frame is data or control frame.
Under Run Frame=Control bit indicating CPU incapable of completing frame.
No Retransmit Frame=Control bit indicating no retransmit after collision.
Enable Long Frame=Control bit enabling long frame transmission.
Disable Cycle Redundancy Check (CRC)=Control bit disable CRC generation for Ethernet frame.
Enable PAD=Control bit indicated frame is shorter than allowed pad with zeros.
TX_EOF=Control bit indicating End-Of-Frame, transmit, Tx, side.

These control bits are passed to the transmit control section 90 and then to the MAC core 80 to generate the Ethernet Packet shown in FIG. 5 independent of the operation of the director CPU after such CPU has passed the data to the transmit FIFO 84 (FIG. 4). More particularly, the transmit control section 90 operates in response to the CPU transmitted data, after storage in the transmit FIFO 84, to control their passage between the director CPU and the PC, or other directors, through the MAC Core 90 under control of the buffer 84 stored Core control signals portion (bits A8-A15 (FIG. 6) of the transmit FIFO 84 stored data independently of the operation of the director CPU.

More particularly, as shown in FIG. 6, each one of the data frames received from the director CPU has a bit therein to indicate the final data byte in the frame and to initiate transfer of the director CPU produced frame residing in the transmit FIFO buffer 84. The transmit control section 90 provides control signals to the MAC Core 90 to effect the transfer of data from the transmit FIFO buffer 84 to the MAC Core 80 and to provide to such MAC Core IEEE Standard 802.3 flow control signals to effect the transfer between the MAC Core and the Ethernet network 64 (FIG. 1). That is, the MAC Core 80 adds the preamble, pads the data field to a minimum number of bytes, here 64 bytes, and appends the FCS for CRC error detection to provide the packet shown in FIG. 5.

Considering now the receipt of Ethernet packet by the MAC Core 80, the MAC Core 80 provides control signals to the receive control section 94 (FIG. 4) to enable the receive control section 94 to initiate a flow of the packets of data from the MAC Core 80 to the receive FIFO 86 and enables a plurality of the packets to be stored in the receive FIFO 86. As noted above, the Ethernet Packet fed to the MAC Core from the Ethernet network 62 is shown in FIG. 5. The incoming packet is processed by the MAC Core 80 and the receive control section 94 in a manner to be described, into the data frame shown in FIG. 7 for storage in the receive FIFO 86. It is noted that the data frame shown in FIG. 7 includes an appended "Status Word", in addition to the Destination Address (here 6 bytes), Source Address (here 6 bytes), Byte Count (here 2 bytes), and Data (here 46 to 1500 bytes) fields. More particularly, the stored packets in the receive FIFO 86 have an Ethernet Frame Data portion, here the lower eight bits A0–A7 of each one of the bytes in the frame and a Status/Control Bits portion, here the higher 8 bits (A8–A15) of each of the bytes in the frame. Here, the Status Word includes:
Receive Successful=Status bit indicating successful packet reception.
Short Packet Received=Status bit indicating received packet is less than the minimum packet size (64 bytes).
Receive CRC Error=Status bit indicating CRC error in received packet.
Receive Maximum Packet Error=Status bit indicating the received packet has exceeded the maximum frame size limit.
Receive Long Packet Error=Status bit indicating the received packet has exceeded the maximum long frame size limit.
Receive Preamble Shrink=Status bit indicating the received packet has preamble shrinkage.
Receive Pause Control Packet=Status bit indicating that a Pause Control packet has been received by the MAC core.

Figure 7:
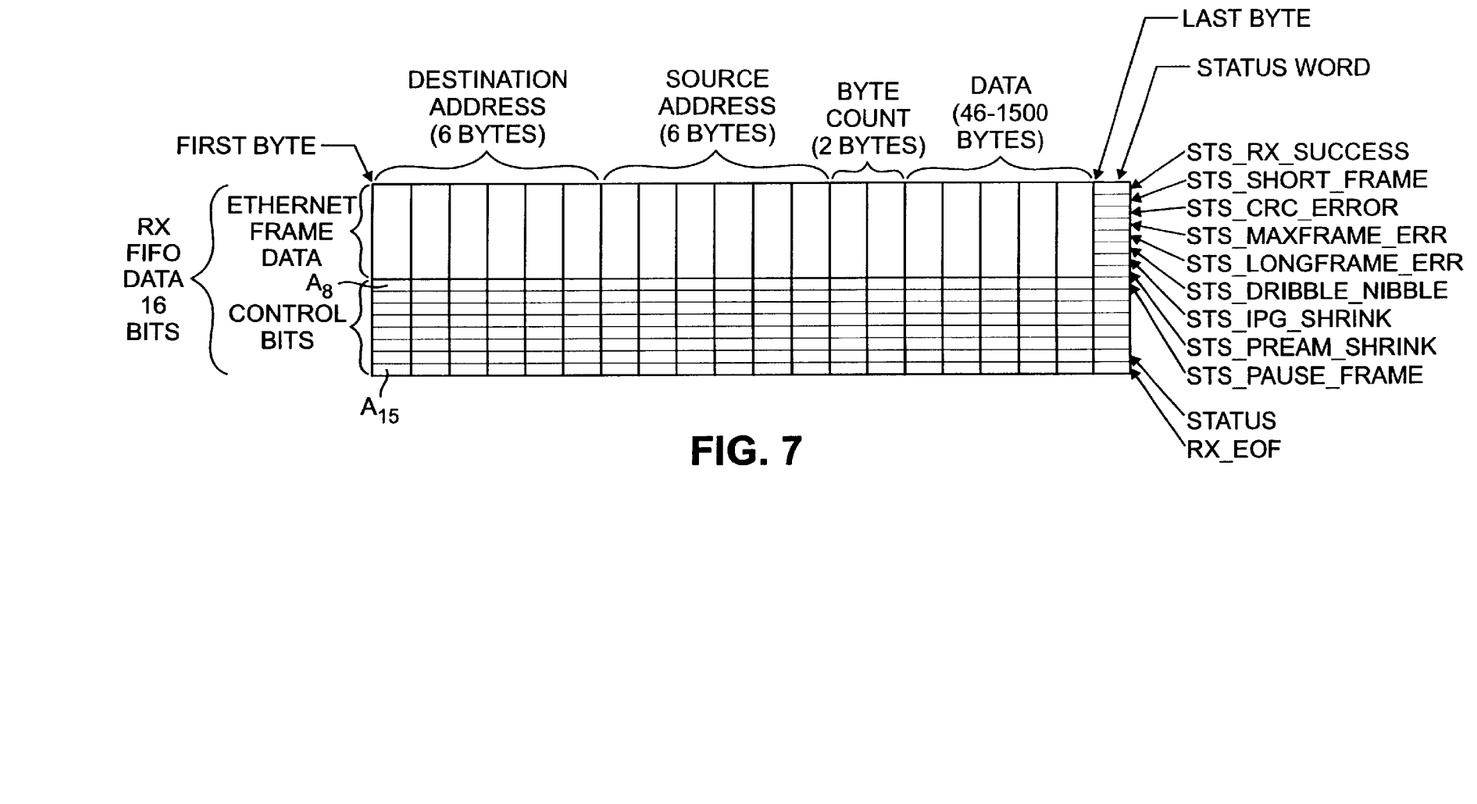
FIG. 7 is a frame produced in the Ethernet controller of FIG. 4 by an Ethernet network used in the system of FIG. 1, such frame being produced by the controller in accordance with the invention.

Status=Status bit indicating the last word contains all status information.

Rx_SOF=Status/control bit indicating receive start of frame.

Rx_EOF=Status/control bit indicating receive end of frame.

In the event a watermark signal from the receive FIFO 86 (FIG. 4) is enabled indicating that the receive FIFO 86 is, or is close to full, a pause control frame is generated from the Pause Frame Generator 88 and sent to the MAC Core 80 for processing.

Figure 8:
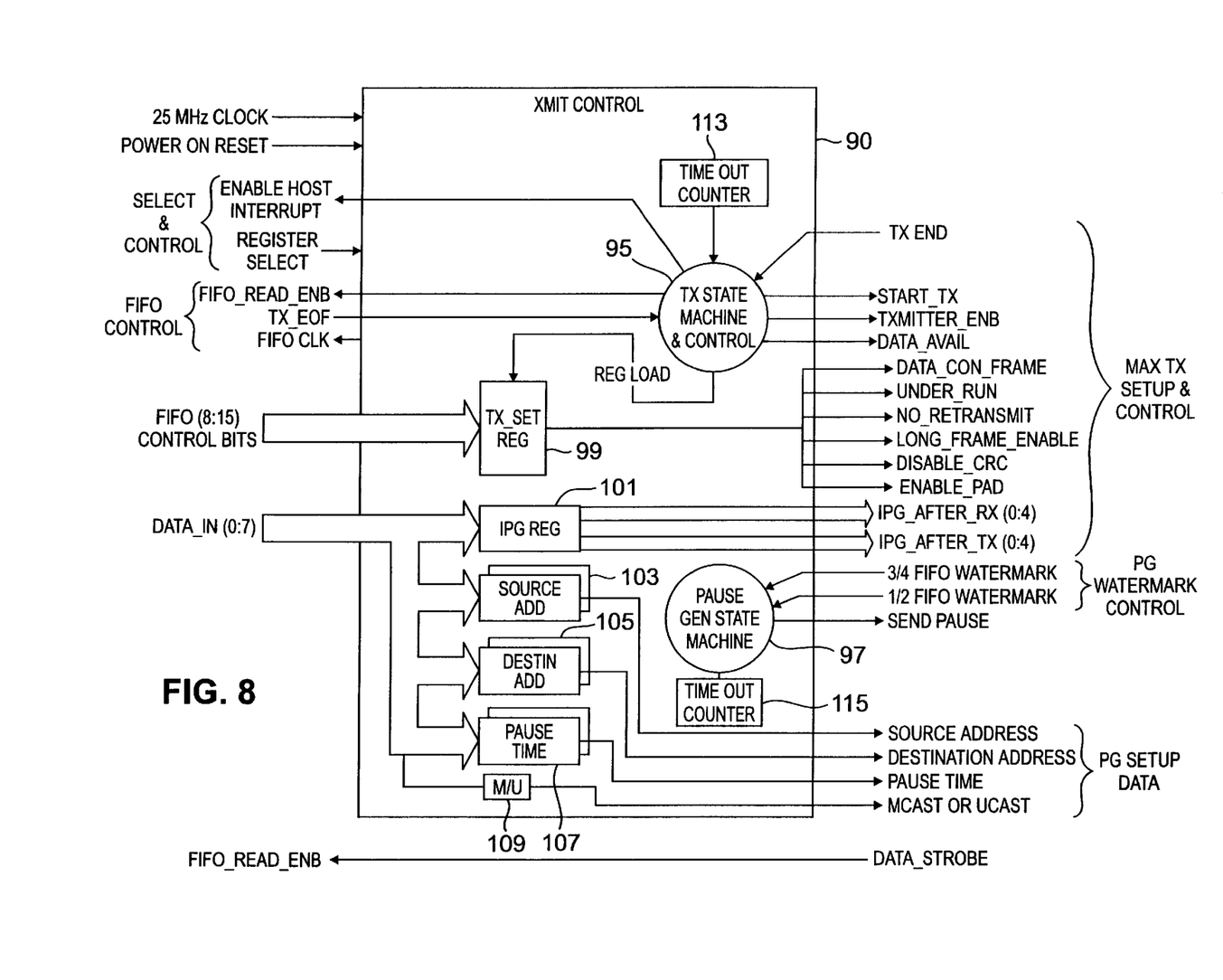
FIG. 8 is a block diagram of a transmit control section of the Ethernet controller of FIG. 4.

Considering in more detail the transmission of data from the director CPU to the Ethernet network, reference is also made to the transmit control section 90 shown in detail in FIG. 8. The transmit control section 90 is shown includes a pair of state machine: A transmit (Tx) state machine 95 for providing MAC Core setup signals for the MAC Core 80; and, a pause generator state machine 97 for providing setup signals for the pause frame generator 88 (FIG. 4). Also included are a transmit set (Tx_set) register 99, an Inter-packet Gap Time (IPG) register 101, a source register 103, a destination register 105, a pause time register 107, a multi-cast/uni-cast (M/U) register 109, and a pair of time out counters 113, 115, one for each of the state machines 95, 97, respectively, as indicated in FIG. 8.

The Tx state machine 95 (Tx State Machine operation shown in FIG. 9) controls the transfer of the frame (FIG. 6) from the transmit FIFO buffer 84 (FIG. 84) to the MAC Core 80. The pause generator state machine 97 is provided for monitoring receive FIFO 86 watermarks, (i.e., how full is the receive FIFO), initiating a pause control frame automatically in response to such ¾ full watermark, and wherein once the received watermark drops to a ½ full mark, a pause frame timer value for the pause frame generator 88 (FIG. 4) is set to zero thereby canceling the pause operation. The pause frame state machine 97 (FIG. 8) also sends the pause frame generator 88 a signal to cancel the pause operation.

Considering first the transmission from the CPU to the Ethernet, the director CPU forms the frame shown in FIG. 6. Referring now to FIGS. 4 and 8, the CPU formatted frame (FIG. 6) is provided to the transmit FIFO 84 on a 16 bit DATA BUS (15:0) from the bus interface 82, as indicated. Also fed to the transmit FIFO 86 are clock pulses from the director via the bus interface 82, as indicated. The DATA BUS has the first 8 bits (i.e., lines) thereof, i.e., DATA (7:0) connected to the transmit control section 90, which provide register initialization during boot-up sequence. The Ethernet Frame data bits A0–A7 from the Xmit FIFO section 84 are connected to the pause frame generator 88 then to the MAC core section 80, as indicated in FIG. 4. The last 8 bits (lines) of the DATA BUS (DATA 15:8), i.e., bits A8–A15, which have the control and status portion (FIG. 6) of the CPU format Ethernet Frame Data are connected to the transmit control section 90, as indicated in FIG. 4.

During the initialization sequence, the following registers are loaded with data: The source address register 103 (FIG. 8) has stored therein the source address to indicate the address to be loaded into the Pause control frame; The destination address register 105 has stored therein the Pause control frame which addresses which Ethernet MAC is to receive the Pause control frame; The Pause time register 107 has stored therein the Pause control frame indicating the time length that the pause time is in effect at the receiving MAC; The M/U register 109 has stored therein data used to indicate whether the Pause control frame is a Unicast or Multicast frame; and The IPG register 101 has stored therein a value for the interpacket gap time between Ethernet packets Ethernet Transmit State Diagram After power-up, and referring to FIG. 9, at Step 200, the Tx state machine 95 is in an idle condition in response to an external reset signal. In the idle condition, the Tx state machine 95 waits for a transmit end of frame (Tx_EOF) flag, or bit, (i.e., Tx_EOF=1) in the control and status portion of the frame fed by the director CPU. This Tx_EOF bit is placed in the last of the bytes shown in FIG. 6. This Tx_EOF bit indicates that the transmit FIFO 84 (FIG. 4) has been loaded with a frame from the CPU and that such loaded frame is ready for transmission to the MAC Core 80. The Tx state machine 95 then begins the operation of transferring the frame to the MAC Core 80 (Step 202); i.e., the state 95 machine enters the first transmit state, TxS1. In the TxS1 state, the MAC is enabled and "Read enable" (i.e., Read_enb=1) is set to a "true" state. The read_enb signal is fed to the transmit FIFO to start the prefetch data/control word. That is, Transmit_enb=1 and Read_enb=1.

Figure 9:
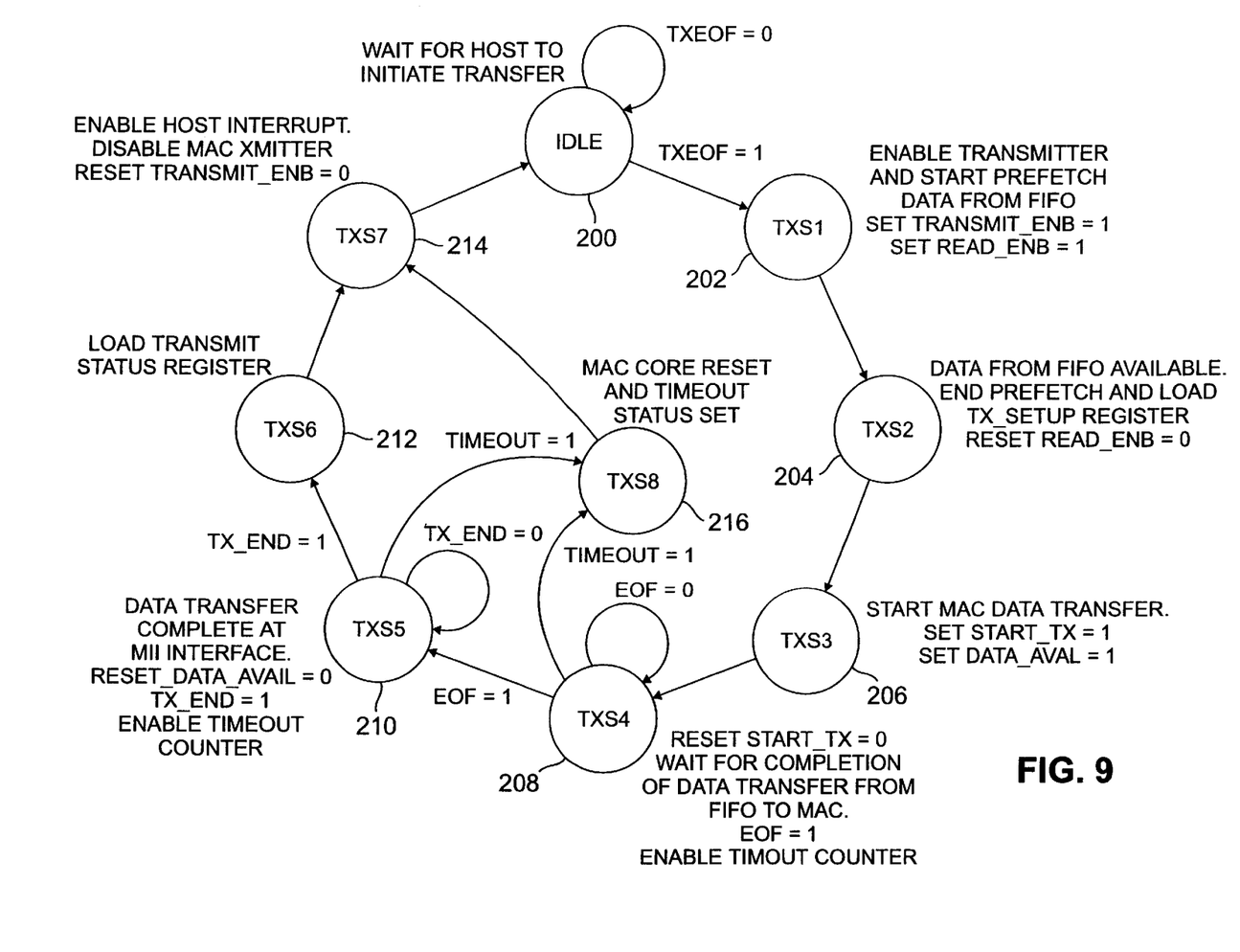
FIG. 9 is a state diagram of one of a pair of state machines in the transmit control section of FIG. 8.

The Tx state machine 95 then enters the second transmit state (TxS2), i.e., Step (204). In the TxS2 state, control data from the FIFO is available and is loaded into the Transmit Setup (Tx_Set) register 203. The pre-fetch data operation is ended by re-setting the FIFO Read_enb=0.

The Tx state machine 95 proceeds to the third state (TxS3) in Step 206. In state TxS3, the MAC Core data transfer starts; Start_Tx=1; and, Data_Avail=1.

Figure 10:
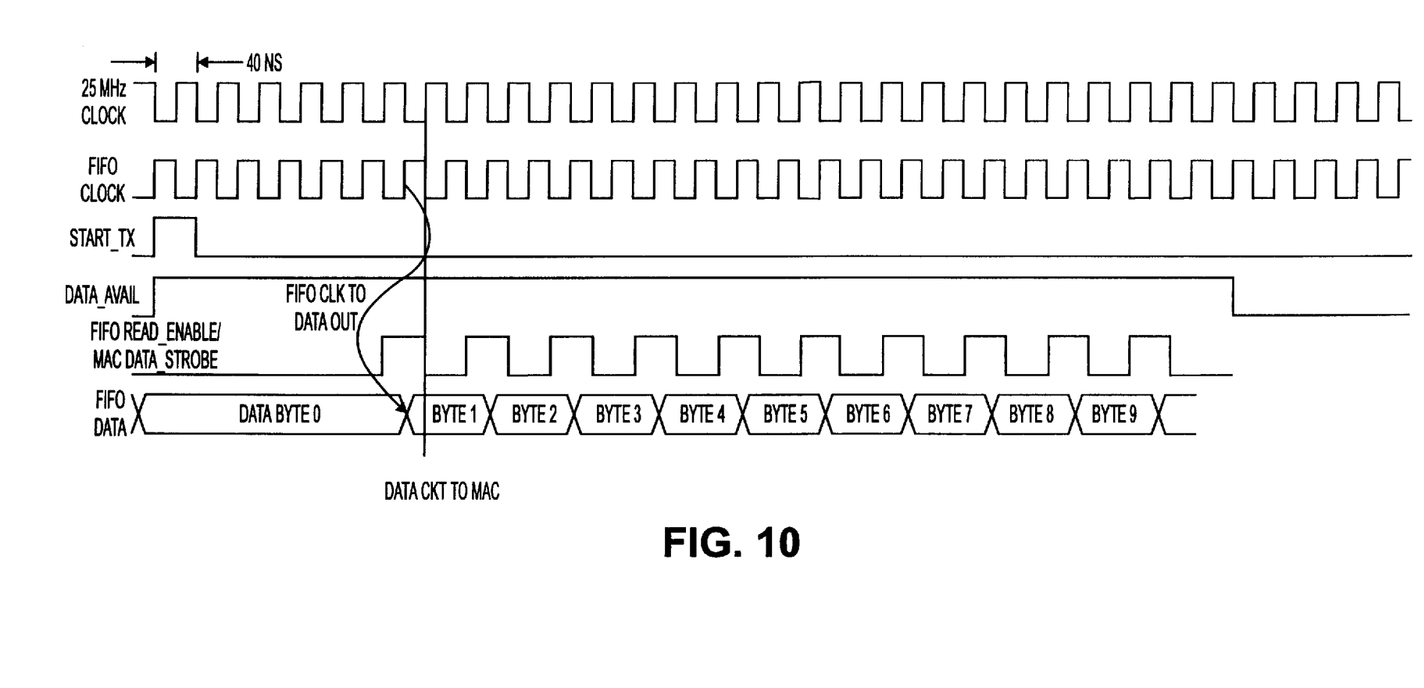
FIG. 10 is a timing diagram useful in understanding the operation of the transmit control section of FIG. 8.

The state machine then proceeds to the fourth state (TxS4) in Step 208. In state TxS4, the data transfer between the FIFO and the MAC Core continues directly through the MAC Core. The Start_Tx is reset, (i.e., Start_Tx=0). The timing is shown in FIG. 10. Also, the Tx state machine 95 checks for the Tx_EOF (the transmit end of frame) control bit. Once the end of frame is found, (i.e., Tx_EOF=1) the state machine is forced in the next state, i.e., the fifth state (TxS5), Step 210. Further, while in state TxS4, a time out counter 205 is enabled to set a timeout status in register 113 (FIG. 8) and an interrupt is sent to the transmitting CPU if the timeout counter ever reaches zero.

When the Tx_EOF=1 bit is detected, the Tx state machine 95 goes to the fifth state TxS5. In state TxS5, the data transferred from the receive FIFO 84 to the MAC Core 80 is complete to the medium independent interface (MII) and Data_Avail is reset. Further, the Tx state machine 95 waits for the completion of the frame transmission at the MII interface, i.e., the state machine waits for Tx_end=1) from the MAC Core. Still further, a TimeOut counter. 113 is enabled if, for some reason, the MAC Core "hangs up". An interrupt would then be sent to the director CPU if the timeout counter ever reached zero.

The Tx state machine 95 then proceeds to the sixth state, TxS6 (Step 212). In state TxS6, the MIB status registers 96 (FIG. 4) are loaded with a status data.

The Tx state machine 95 then proceeds to the seventh state, TxS7 (Step 214). In state TxS7, the frame transmission to the MAC Core 80 is completed. The MAC Core 80 is disabled from any more transmission, transmit_enb=0 (i.e., reset). Further, a CPU interrupt is enabled (i.e., enable_host interrupt) to transfer the MIB status register information to the CPU data bus.

If the timeout counter ever reached zero indicating that the MAC is hung then the state machine proceeds to the eighth state, TxS8 (Step 214). In state TxS4, the timeout flag is set to flag1 if data transfer to the MAC Core 80 never completes. In state TxS5, the timeout flag is set to flag2 if the MII signal never indicates the end of the transmission of data. The CPU interrupt is enabled, the MAC Core 80 is disabled, i.e., the MAC Core 80 is then set a soft reset.

Figure 11:
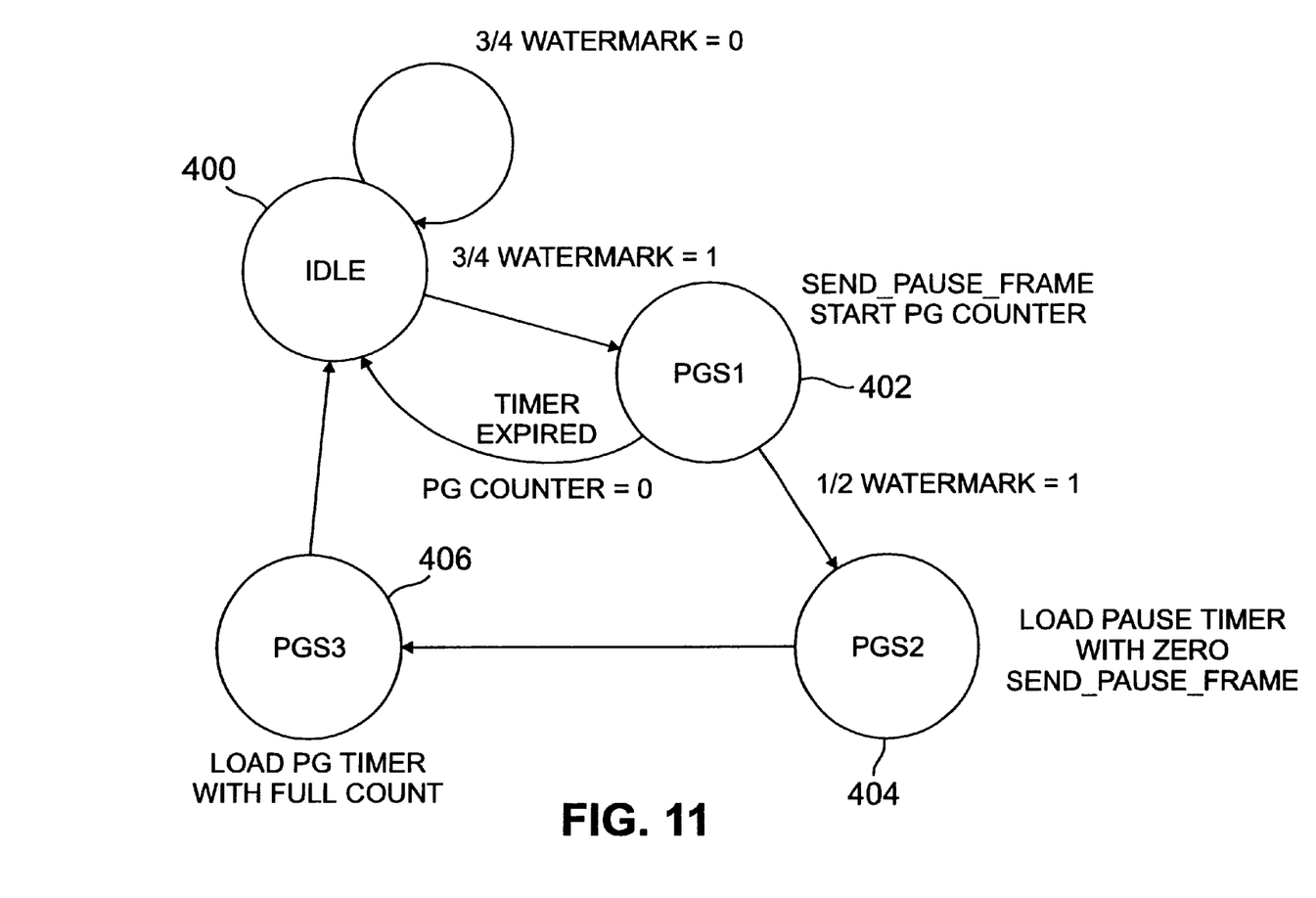
FIG. 11 is a state diagram of a second one of a pair of state machines in the transmit control section of FIG. 8.

Referring now to FIG. 11, the pause frame generator state diagram of the pause generator 97 (FIG. 8) is shown. An external reset forces the PG state machine 97 to enter the idle state (Step 400). The PG state machine 97 idles in this state until a 3/4 watermark signal is received from the receive FIFO 86 indicating that the receive FIFO 86 is 3 quarters full. This indicates that a pause frame should be initiated from the pause frame generator 88 (FIG. 4).

The PG state machine proceeds to the first pause generator state, PGS1 (Step 402). In state PGS1, the send_pause signal for the pause frame generator 88 is set to initiate the pause frame generator 88. The source, destination address, and pause time in registers 103, 105 and 107, are loaded into the pause frame generator 88 at this time. Also, in this state, the PG counter is loaded and starts counting. If the PG counter reaches zero state, this indicates that the receive FIFO 86 is still at, or above, the ¾ watermark and another pause frame is initiated. When the FIFO watermark drops down to the ½ full mark, the PG state machine 97 enters the second state PGS2 (Step 404) and this indicates that the pause operation should be canceled. In this second state PGS2, the pause timer register 107 is loaded with a zero value. The Send_Pause signal is set to initiate the pause frame generator 88.

The PG state machine 97 then proceeds to the third state PGS3 (Step 406). In this third state, the PG counter is loaded with a full count for the next pause operation to begin.

Referring now to the receive operation, as noted above, the Ethernet controller 66 (FIG. 4) includes a receive control section 94, shown in detail in (FIG. 12), the receive FIFO 86, the pause timer 92, and status registers in the MIB section 94.

Figure 12:
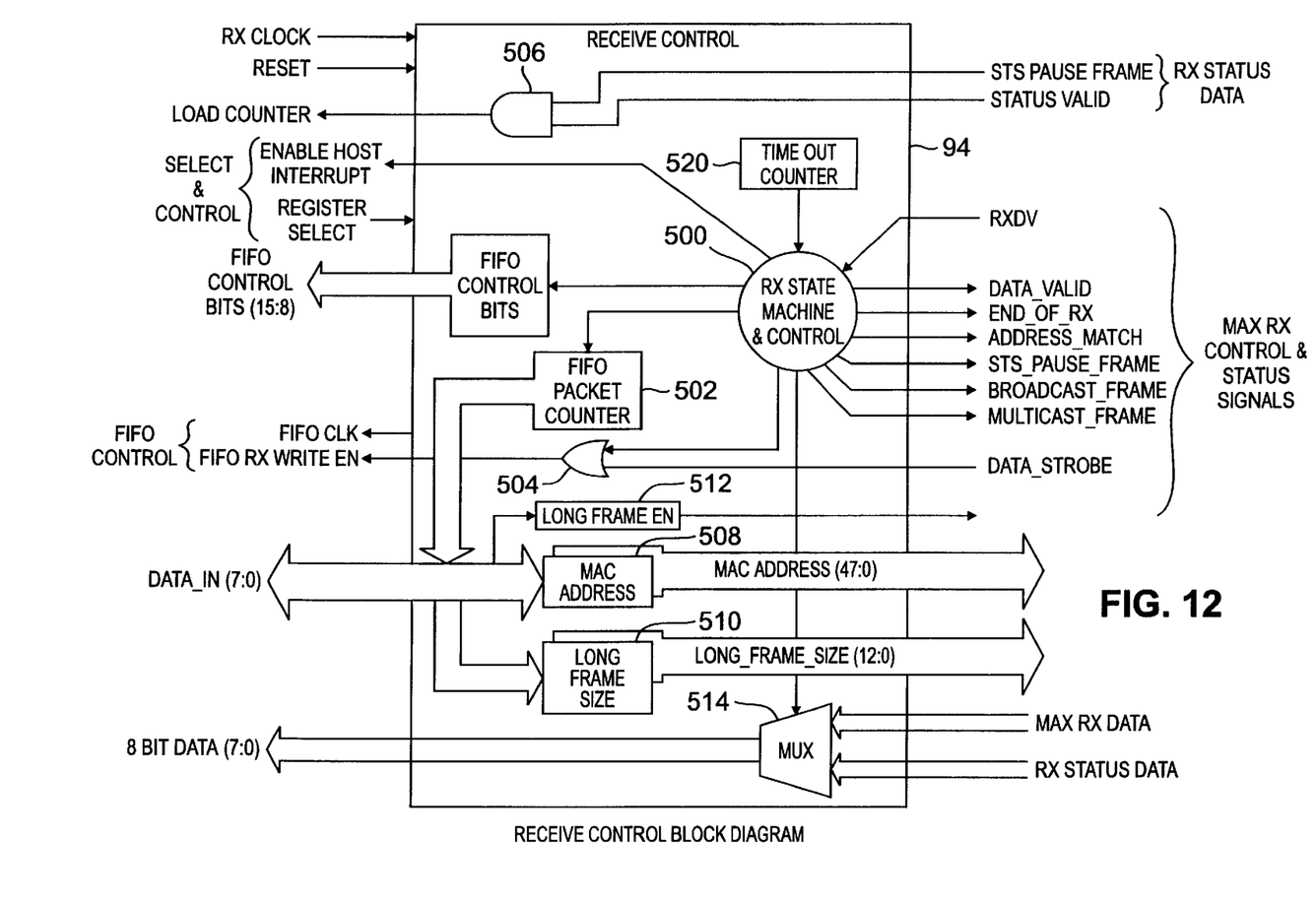
FIG. 12 is a block diagram of a receive control section of the Ethernet controller of FIG. 4.

Referring to FIG. 12, the receive control section 94 includes one state machine, i.e., a receive (Rx) state machine (Rx state machine operation shown in FIG. 13) and control 500, a FIFO packet counter 502, an OR gate 504, and AND gate 506, a MAC address register 508, a Long frame size register 510, a long frame enable bit 512, and a multiplexer 514, arranged as shown. The three registers 508, 510 and 512 are initialized during boot sequence (MAC address, Long Frame Size, Long Frame Enable). The Rx state machine 500 is fed MAC control signals from the MAC Core 80, as indicated in FIG. 4. The Rx state machine 500 controls the operation of transferring the packet, shown in FIG. 5, from the MAC Core 80 to the receive FIFO 86 in the format shown in FIG. 7, determines if the packet is addressed to this MAC Core 80, and if not, flushes it from the receive FIFO 86 by loading the pointer address prior to accepting the packet, loads a status word into the receive FIFO 86 after the entire packet has been received, and sends a CPU interrupt. The receive FIFO frame is shown in FIG. 7, as noted above, which includes an Ethernet Frame Data portion, here the lower eight bits of each word, and a status and control bit portion, here the upper eight bits of each word. Here, each frame has a last byte followed by a status word which is controlled by Mux 514. If a pause frame is received by the MAC core 80 the signals sts_pause_frame and status valid signals are logically "AND" to provide the load signal for the pause timer 92 which is loaded with the data from the pause frame.

The operation of the receive control section, is described below as a function of each states in the receive (Rx) state machine 97. Thus, referring to FIG. 13, an external reset forces the Rx state machine 500 to enter the idle state (Step 600). The idle state waits until a Rx_Dv signal from the MAC Core 80 (initially reset to Rx_Dv=0) is valid (Rx_Dv=1) which indicates that the MAC Core 80 has valid incoming data and as long as the MAC Core 80 is enabled, the process begins to load frame data from the MAC Core 80 to the receive FIFO 86, i.e., Rec_enb is set (Rec_enb 1).

Figure 13:
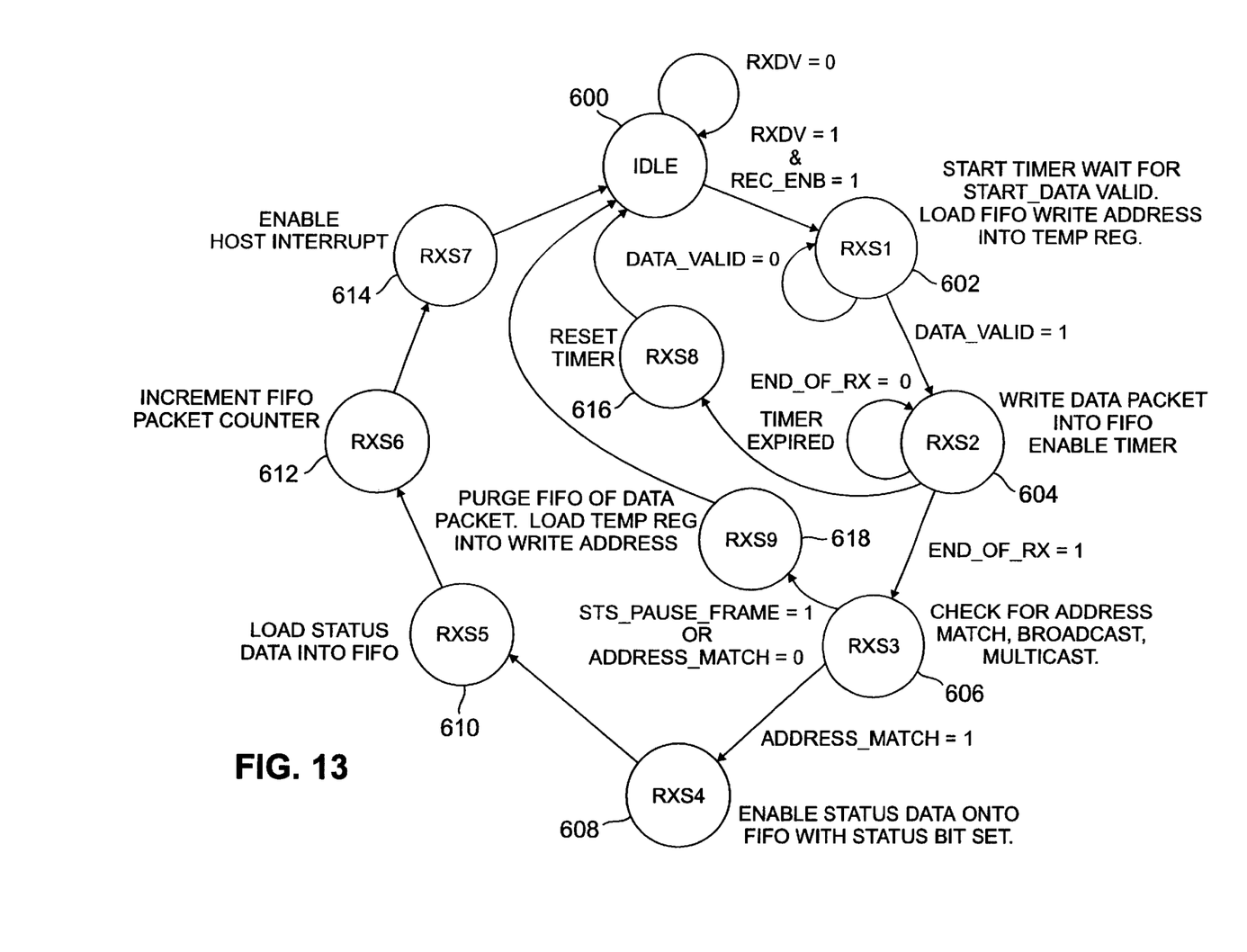
FIG. 13 is a state diagram of a state machine in the receive control section of FIG. 12.

The Rx state machine 500 then proceeds to the first state RxS1 (Step 600). In the first state RxS1, the temporary write address register in the FIFO 86 is loaded with the receive FIFO 86 write pointer. The timer 529 (FIG. 12) is started and waits for a Data valid signal from the MAC Core 80 to go "true", that is, the Start timer waits for a Start_data valid signal (i.e. Data_valid=1). If the timer expires without the Start_data valid true, (i.e. data_valid=0), the Rx state machine 500 is forced to the eighth state RxS8 which indicates that false data was received. In the state RxS8, the timer is reset and the Rx state machine 500 then proceeds to the idle state. When the Data_valid signal is true (i.e., Data_valid=1), then the Rx state machine 500 is forced to the second state RxS2 (Step 604).

In the second state RxS2, frame data from the MAC Core 80 is written into the receive FIFO 86. The Rx state machine 500 waits for an End_of_Rx=1 signal from the MAC Core 80 indicating that the data packet reception is completed. The timer counter 520 (FIG. 12) reset and enabled when in the RxS2 state. If the counter expires it indicates that the data transfer is "stuck" and the Rx state machine 500 is forced into the RxS8 state where the timer is reset. As noted above, if the Rx state machine 500 is forced to state RxS8, the timer counter 520 is reset and then the Rx state machine 500 proceeds to the idle state.

In response to an End_of_Rx=1 signal, the Rx state machine 500 proceeds to the third state RxS3 (Step 606).

In State RxS3, the Rx state machine 500 checks for an address match using register 508, broadcast, or multi-cast message from the MAC Core 80. If there is an address match, the address_match signal=1 and the Rx state machine 500 goes to the fourth state RxS4. If the MIB 96 (FIG. 4) indicates that the frame is a pause control frame (i.e., STS_pause_frame =1), or if there is no address match (i.e., address_match=0) the Rx state machine 500 is forced to the ninth state RxS9. In state RxS9, a control signal is fed to the receive FIFO 86 to purge such receive FIFO of data packets. The Rx state machine 500 then returns to the idle state machine.

The fourth state RxS4 (Step 608) indicates an address_match=1, the multiplexer 514 (FIG. 13) is enabled for transfer of status data from the MAC Core 80 to the receive FIFO 86 and the status control bit is set.

The Rx state machine 500 proceeds to state RxS5 (Step 610). In state RxS5, the status data (i.e., the status word following the "last Byte" (FIG. 7), is loaded into the receive FIFO 86.

The Rx state machine 500 then proceeds to state RxS6. In state RxS6, the FIFO packet counter 502 is incremented.

Figure 14:
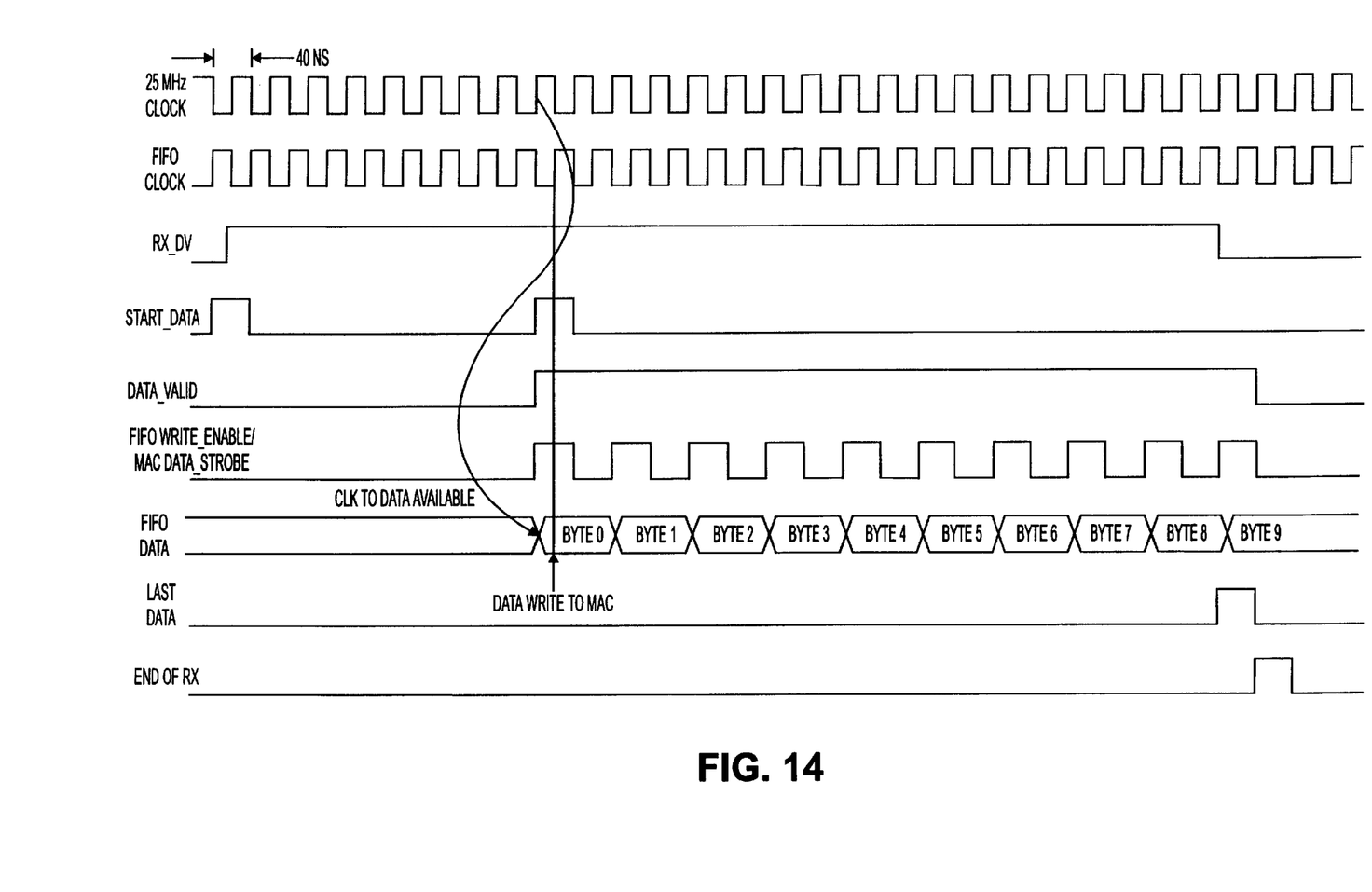
FIG. 14 is a timing diagram useful in understanding the operation of the receive control section of FIG. 12.

The Rx state machine 500 then proceeds to state RxS7 (Step 614). In state RxS7, the director CPU is sent an interrupt to enabled for the transfer of frame data from the receive FIFO 86. The Rx state machine 500 then returns to the idle state. A timing diagram for data reception is shown in FIG. 14.

Other embodiments are within the spirit and scope of the appended claims.

What is claimed is:

1. A controller for providing buffering between a central processing unit and a network, such controller being coupled to the network through an Ethernet bus, such controller comprising:

an Ethernet MAC Core coupled to the Ethernet bus;

a buffer disposed between the MAC Core and the central processing unit for storing frames, each frame having Ethernet frame data portion and a Core control and status signal portion; and a control section for enabling the frames to pass between the central processing unit and the MAC Core under control of the buffer stored Core control signals portion, such enabling being under control of the control signals portion, such enabling being independent of the operation of the central processing unit.

2. The controller recited in claim 1 wherein the buffer comprises a FIFO.

3. The controller recited in claim 2 wherein each one of the frames has a bit therein to indicate the final data byte in the packet and to initiate transfer of the frame to the buffer.

4. The controller recited in claim 3 wherein the control section provides control signals to the buffer and the MAC Core to transfer data from the buffer to the MAC Core and to provide to such MAC Core IEEE Standard 802.3 flow control signals.

5. The controller recited in claim 1 wherein the control section initiates a flow of data from the MAC Core to the buffer and enables a plurality of the frames to be stored in the buffer.

6. The controller recited in claim 5 wherein each one of the plurality of frames received by the MAC Core includes an end of frame signal and wherein the buffer has a control bit set by the end of frame bit.

7. A controller for providing buffering between a central processing unit and a network, such network being coupled to the controller through an Ethernet bus, such controller comprising:

an Ethernet MAC Core coupled to the Ethernet bus;

a buffer disposed between the MAC Core and the central processing unit for storing data/control packets, each packet having an Ethernet frame data portion and an Ethernet MAC Core control signal portion; and a control section for enabling the frames to pass between the central processing unit and the MAC Core under control of the buffer stored Core control signals portion of the frame wherein the control section includes a transmit controller for controlling transmission from the central processing unit to the network, such transmit controller comprising:

a pause frame generator;

an MIB having status registers;

a plurality of other registers initialized during boot sequence;

a first state machine for controlling transfer of the frames from the buffer to the MAC Core, waiting for completion status from the MAC Core, and sending interrupts to the central processing unit;

a second state machine for monitoring received FIFO watermark, a ¾ full mark initiating a pause control frame and wherein the pause frame generator automatically performs a pause frame in response to such ¾ full mark, and wherein once the received watermark drops to a ½ full mark, a pause frame timer value is set to zero and sent to cancel the pause operation.

8. A controller for providing buffering between a central processing unit and a network, such network being coupled to the controller through an Ethernet bus, such controller comprising:

an Ethernet MAC Core coupled to the Ethernet bus;

a buffer disposed between the MAC Core and the central processing unit for storing data/control packets, each packet having an Ethernet frame data portion and an Ethernet MAC Core control signal portion; and a control section for enabling the frames to pass between the central processing unit and the MAC Core under control of the buffer stored Core control signals portion of the frame wherein the control section includes a receive controller for controlling transmission from the network to the central processing unit, such receive controller comprising:

a pause timer;

an MIB having status registers;

a plurality of other registers initialized during boot up sequence;

a first state machine for controlling transfers of the frames from the MAC Core to the buffer, determining if the frame is addressed to this MAC Core and, if not, removing it from the buffer, loading a status word into the buffer after the entire frame has been received by the buffer, and sending the central processing unit an interrupt.

* * * * *